June 25, 1929.  W. WRIGHT  1,718,912
SUPPORTING MEANS FOR AIR LINES
Filed Jan. 23, 1926   3 Sheets-Sheet 1
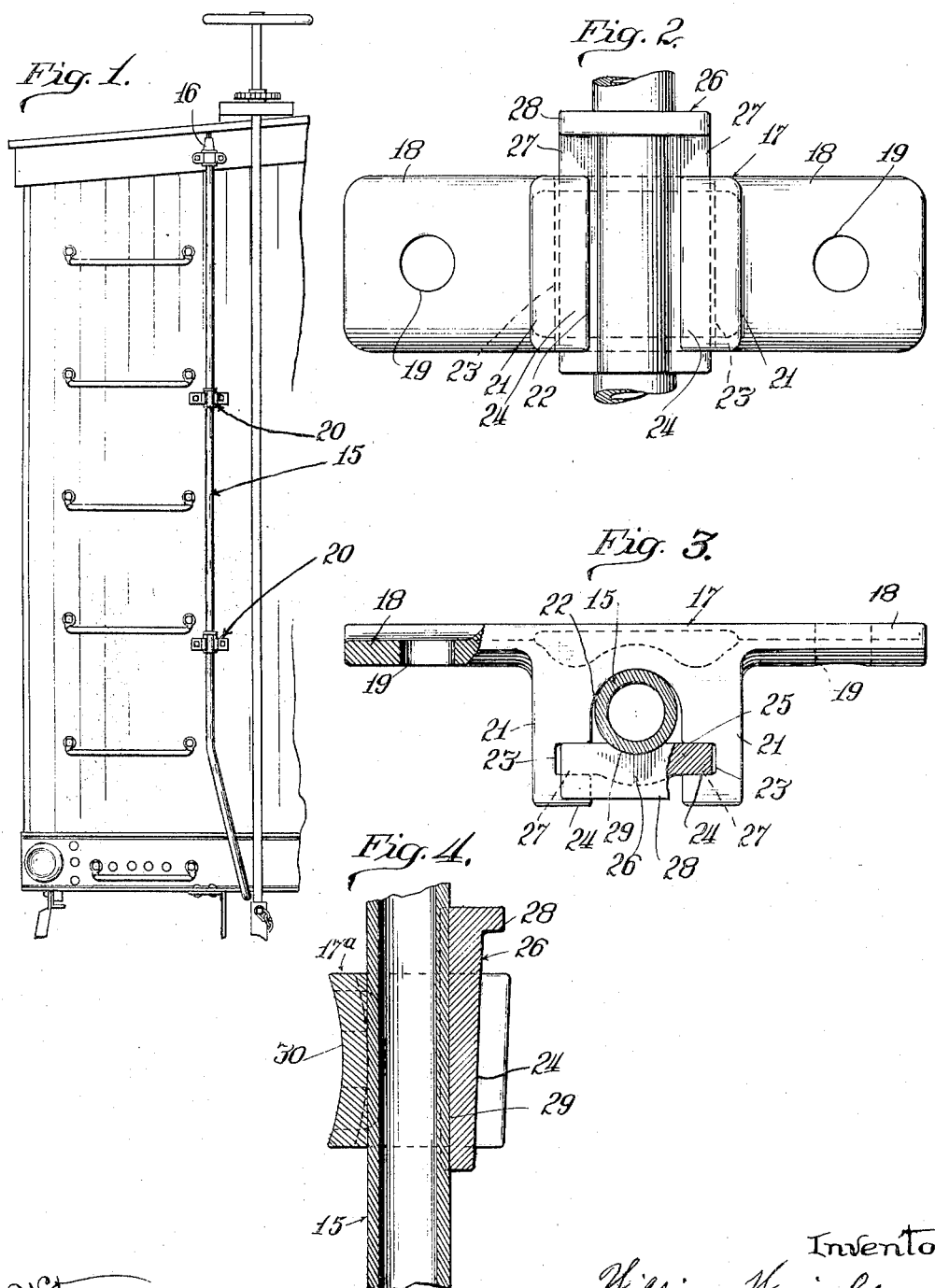

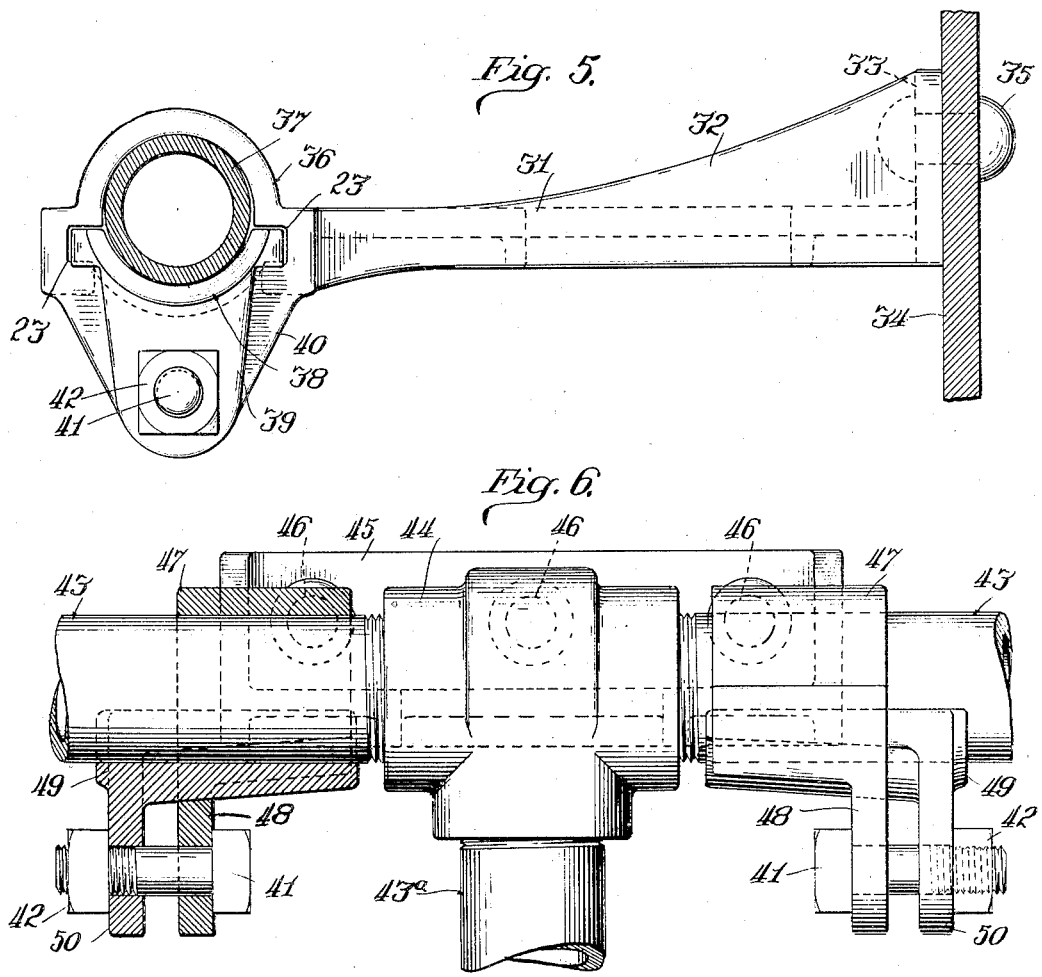
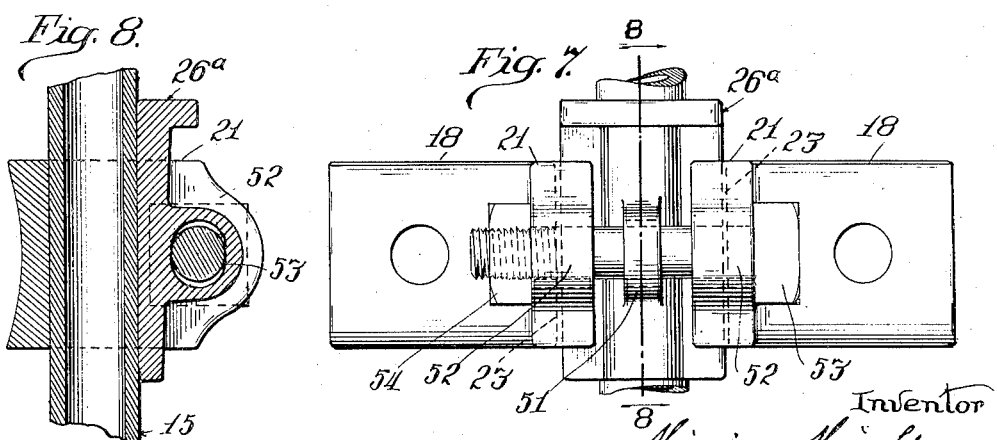

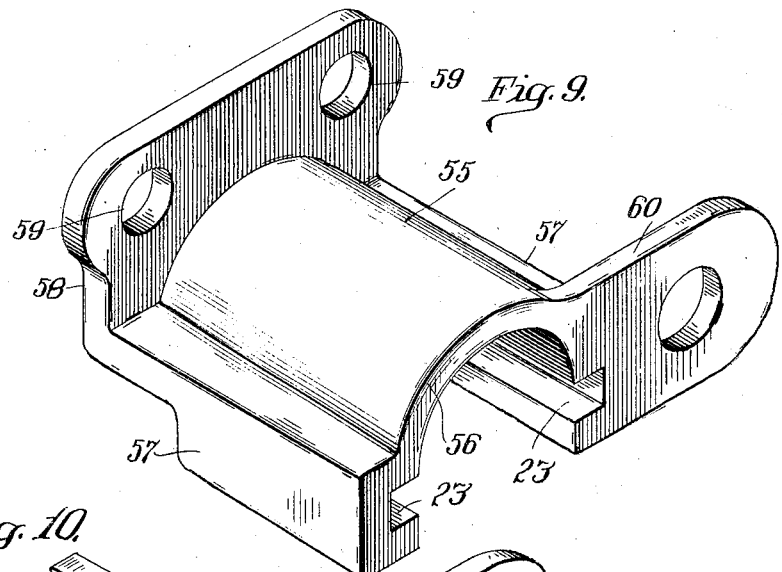
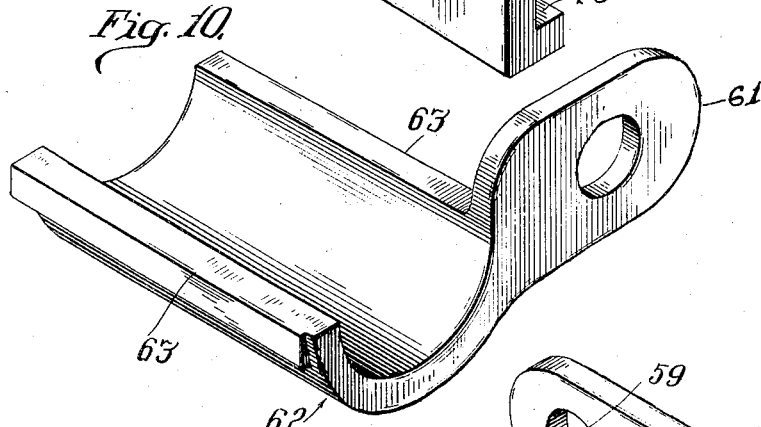
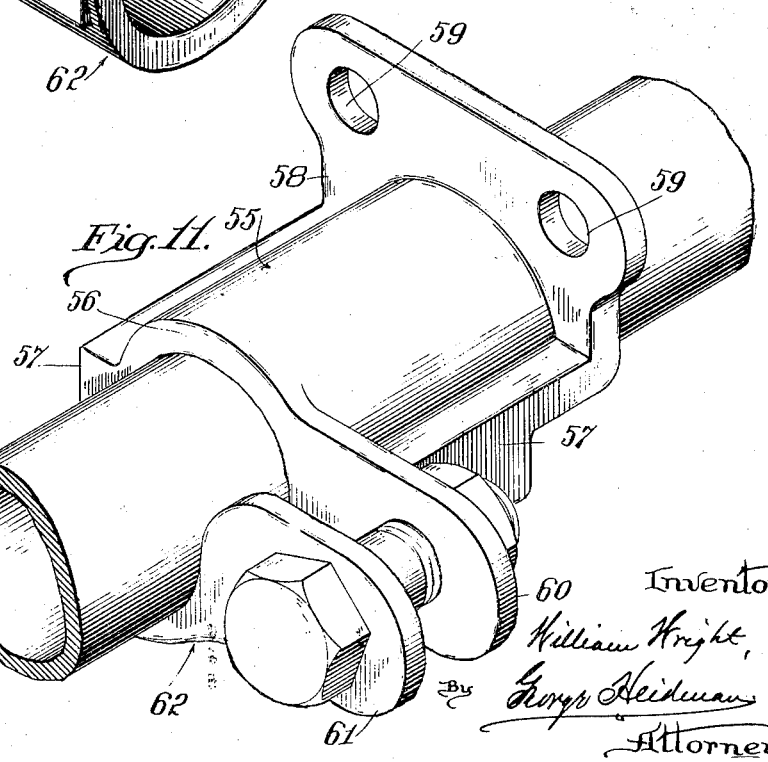

Patented June 25, 1929.

1,718,912

UNITED STATES PATENT OFFICE.

WILLIAM WRIGHT, OF CHICAGO, ILLINOIS, ASSIGNOR TO E. PAYSON SMITH, OF SPRINGFIELD, ILLINOIS.

SUPPORTING MEANS FOR AIR LINES.

Application filed January 23, 1926. Serial No. 83,330.

My invention relates to means for supporting and securing the air pipes or lines of the air brake system to the car body or car underframe, in order that the pipes or lines may be firmly held against displacement and therefore retained in place to avoid rupture of the pipe connections which would result in leaky air lines and therefore interfere with proper operation of the air brake system.

My invention contemplates means which may be easily applied, equally as well to the air pipes or lines of cars in service, as to cars under construction; a construction which will permit ready renewal of the air pipe or line if occasion should require without necessitating a dismantling of my improved retaining or supporting means.

Another object of my invention is to provide means which will require no special skill or tools in its installation and which at the same time will be strong and durable and comparatively light and cheap to manufacture.

The objects and advantages of my invention will be readily comprehended from the detailed description of the accompanying drawings wherein:

Figure 1 illustrates a portion of the end of a freight car and its air pipe showing my improved supporting means in place.

Figure 2 is an elevation of my improved supporting device, as employed in Figure 1, before application to the air pipe or line.

Figure 3 is a top plan view thereof showing its application to the pipe.

Figure 4 is a longitudinal sectional view illustrating a modified form.

Figure 5 is an elevation of a modified form for application to the air line or pipe beneath the car.

Figure 6 illustrates the application of my invention to a pair of horizontally disposed lines at a point adjacent to the pipe coupling; with one portion of the supporting means being shown in longitudinal section while the other portion is shown in side elevation.

Figure 7 is an elevation of another modified form.

Figure 8 is a vertical sectional view taken on the line 8—8 of Figure 7.

Figure 9 is a perspective view illustrating a further modification of my pipe supporting member.

Figure 10 is a perspective view of the complementary or clamping member employed with the supporting member shown in Figure 9.

Figure 11 is a perspective view of the means, disclosed in Figures 9 and 10, applied to a pipe.

In the exemplification of the invention as disclosed in the first three figures of the drawings, my improved supporting and retaining means is of a type more especially intended for supporting the vertically disposed air pipe 15 secured at the end of a freight car as disclosed in Figure 1 and leading upwardly from the line beneath the car to the valve generally indicated at 16 located adjacent to the top of the car in the manner usually employed. The device, as employed in Figure 1, comprises a suitable casting formed to constitute the base or body portion 17 having the two laterally disposed lobes or wings 18, 18 at opposite sides of the intermediate or main body portion and these lobes or wings are apertured as at 19 to receive fastening bolts, screws or rivets whereby the device is secured to the body of the car as shown in Figure 1, at 20, 20; it being understood that any suitable number of supporting means are employed commensurate with the length of the pipe or air line which it is intended to secure in place.

The body portion 17 comprises the forwardly disposed portions or extension 21, 21 arranged preferably at right angles to the longitudinal axis of the body portion and lobes or wings 18 as shown in Figure 3. The portion intermediate of the extensions 21, 21 is preferably formed with an arcuate socket at 22 to provide a suitable pocket or seat for the air line or pipe 15, see Figure 3. The wings or extensions 21, 21 are each provided, at a point adjacent to the outer ends thereof and on the opposing surfaces, with grooves 23, 23 extending through from top to bottom of the extensions; the grooves 23, 23, preferably becoming slightly narrower toward the bottom of the device. That is to say, the grooves 23 are so formed that the distance between the outer edge 24 and the wall 25 at the inner side of the grooves becomes gradually shorter toward the bottom of the device.

The grooves 23, 23 are intended to receive a sliding key 26 which consists of an elongated plate which tapers slightly toward the bottom and is formed to have the two longitudinal edges 27, 27 adapted to fit into the grooves 23, 23; while the upper end of the key is preferably provided with an enlargement or forwardly presented finger grasping flange or head 28.

The wings or extension 21, 21 extend forwardly of the base portion of the device a distance sufficient to permit the location of the grooves 23, 23 at a point removed from the base of the socket 22 in order to permit passage of the air line or pipe 15 therethrough and at the same time enable insertion of the slide key 26 into place; the rear side of the slide key being preferably dished or longitudinally channeled as shown at 29 so as to somewhat fit about the forward face of the air line or pipe 15 as more clearly shown in Figure 3.

After the body portion of the retaining device has been secured in place on the car wall rearward of the air line or pipe with the pipe located in the socket 22 intermediate of the wings or extensions 21, 21, the key member 26 is then inserted downwardly (when the device is vertically arranged as shown in Figure 1) into the grooves 23, 23 with the head or flange portion 28 upwardly as shown in Figure 2; the key being forced downwardly into the grooves which causes it to have a firm wedging relation with the air pipe; while the tapering of the grooves and of the slide key will also induce firm frictional relation to be obtained whereby the key will be held against any accidental movement.

In Figure 4, I show my improved supporting means, (which is substantially the same construction as that previously described except at the rear side) with the body portion 17ª dished in a vertical manner at 30 in order to adapt the device to the end walls of a freight car formed of or reenforced with corrugated metal having the corrugations extending crosswise of the car. The dishing of the body portion as shown at 30 enables the device to be arranged flush with the wall of the car to enable a secure fastening of the same to be made. The formation of the grooves 23, 23, previously described, namely with the grooves becoming gradually narrower toward the bottom as well as the taper of the wedge plate or key are very clearly shown in Figure 4 as is also the general formation of the wedge plate of key 26.

In Figure 5 I show the application of my invention to the air lines beneath the car and therefore illustrate my retaining means provided with an integral arm 31 disposed from one side of the body portion of the device and preferably provided at the end with a reinforcing web 32, terminating in an angularly or laterally disposed flange 33 adapted to extend flush with a portion of the center sill shown at 34 and to which it may be secured by suitable rivets or bolts as at 35. The bracket arm 31, as previously stated, is formed integral with and disposed laterally from one side of the main body portion 36 which is provided with a suitable arcuate channel extending horizontally therethrough from side to side to receive the horizontally arranged air pipe or line 37. The body portion 36, like the body portion 17 in the previously described construction, is provided with the grooves 23, 23 adapted to receive the longitudinal sides of a key or wedge member 38 which is substantially of the same construction as the key 26 in Figure 2, except that the flange at one end thereof is extended to a greater extent to form a projection as shown at 39. The body portion 36 is likewise provided with a projection or flange 40 adapted to extend toward the same side of the device and substantially parallel with the projection 39 of the key member. The flange 40, as well as the flange or extension 39, are both provided with suitable apertures to receive a headed bolt 41, the opposite end of which is threaded to receive nut 42. As the device, as well as the latch member or key in its application to the air line beneath the car, is arranged horizontally, the means just described are provided to prevent movement of the key through vibration or otherwise. By screwing the nut 42 into firm contact with the flange 39 of the slide key (or with the flange 40 of the body portion), it is evident that the flanges will be drawn toward each other and thereby force the slide key lengthwise of the grooves 23, while at the same time tending to induce a slight tilting action on the part of the key at the initial end of the grooves which will provide a very firm gripping relation with the air line or pipe 37; the structure, like that in Figures 1 and 4, providing a large bearing and gripping surface on the pipe.

In Figure 6 I show the application of the form disclosed in Figure 5, to a pair of air lines or pipes 43, 43 on opposite sides of a T-coupling 44 which may also receive a third branch or pipe 43ª disposed at right angles to the pair of aligned pipes. The supporting device shown in Figure 6, like that shown in Figure 5, is more particularly adapted for use beneath the car and is substantially the same as that in Figure 5, consisting of the bracket arm like arm 31 in Figure 5, terminating in the wide flange or base 45 apertured at 46 to permit the device to be secured in place on any suitable part of the car underframe or car body. The construction involves a pair of pipe holding members disposed in a direction transversely of the arm or bracket portion; both members being identical in construction to that shown in Figure 5 and consisting of the channeled or socketed body portions 47, 47 for passage of the pipes 43 therethrough; the body portions 47, like in Figure 5, being bifurcated or open on the lower side in Figure 6, except for the flange or projection 48; with the bifurcations or spaced wings (like in the other constructions) having similar grooves 23 to receive the longitudinal sides of the key members 49, which also are of substantially the same construction and configuration as that illustrated in Figure 5 and having the depending flanged head 50 apertured to register with an aperture in the depending flange 48 of the body portion to receive bolt 41, held in place by means of the nut 42, like in the construction shown in Figure 5. The structure disclosed in Figure 6 like that shown in Figure 5 is more especially intended for use in situations where the air lines or pipes to be retained are disposed horizontally with the result that the wedging members or keys are likewise disposed horizontally and for that reason means have been provided to prevent accidental movement of the wedge plates or keys through vibration or accidental contact. The screwing of the nuts 42 on the bolts 41 will firmly hold the wedge plates or keys in clamping position.

In Figures 7 and 8, I show a slight modification of the type of retaining means disclosed in Figure 2; with the retaining means comprising the side extensions or ends 18, 18 having the main intermediate body portion with the forwardly extending wings or extensions 21, 21 grooved from top to bottom to receive the wedge plate or key like in Figure 2. In this construction, means have been provided to prevent any accidental displacement of the wedge plate or key 26ª; the key in general respects being identical with key 26 shown in Figure 2, except that at a suitable intermediate point on the outer side thereof it is shown provided with a lobe or ear 51 adapted to be disposed parallel with the wings or extended portions 21, 21 of the body portion and intermediate thereof. The wings or extensions 21, 21 in this construction are extended a greater distance forward of the grooves 23, 23 than is the case with the construction shown in Figure 2 in order to provide the lobes 52 which extend substantially parallel with the ear 51 of the wedge plate or key. The lobes 52 and ear 51 are apertured to receive a bolt 53 having a head at one end and threaded at the other to receive a nut 54. The construction, as shown in Figures 7 and 8, it is apparent may also be employed for supporting horizontally disposed air lines or pipes, as the bolt 53 will prevent accidental displacement of the wedge plate or key; it being understood, that where the retaining means is applied as shown in Figure 1, gravity will prevent movement of the wedge plate or key 26 out of the groove.

Figures 9 and 10 illustrate a further modification of the invention, wherein the main body member 55 (Figure 9) is shown preferably arcuate or somewhat semi-cylindrical at 56 to provide a suitable pipe receiving socket; the longitudinal sides 57 being somewhat enlarged to receive the grooves 23; the entire lower side of the body and its channel being open to permit the device to be readily placed about the rear side of a pipe. One end of the main member 55 is shown provided with the attaching flange 58 disposed substantially upward at right angles to the body portion and apertured at 59; the construction being more especially adapted for supporting horizontally disposed pipes or air lines. The opposite or forward end of the body portion or main member is provided with a flange or ear 60 disposed at right angles from one longitudinal side of the member and apertured to receive a suitable bolt which also passes through a registering aperture in the flange or ear 61 extending from one longitudinal side of the clamping member or wedge plate 62 shown in Figure 10. The clamping member 62 is also preferably made arcuate or substantially semi-cylindrical to provide, in conjunction with the main member 55, a suitable socket for the pipe or air line. The opposite longitudinal edges of member 62, like the wedge plates or keys in the previously described constructions, being disposed laterally outward for insertion in the grooves 23 of the main or body member; the clamping member 62, with its longitudinal sides 63, 63, preferably tapering toward what may be termed the inner end to correspond with the taper which is preferably made in the grooves 23, as previously described, so as to effect a firm wedging relation with the pipe.

I have shown various adaptations of my invention, with the modification in Figures 9 and 10 as being especially intended for supporting horizontally disposed pipes or air lines; but it will be understood that the type illustrated in Figures 9 and 10 may be readily adapted to pipes disposed in a different manner by having the apertured flange 58 formed to correspond with the plane of the surface or element to which the device is to be secured.

It will be understood that the retaining means may be made of suitable cast metal possessing slight resiliency so that a firm wedging action may be provided; the clamping members or plates in certain instances being firmly drawn into the groves through the action of the bolts and nuts; all of the exemplifications of the invention providing a large bearing and gripping relation between the wedge plate or keys and the pipes to which the means are applied; and while I have disclosed the application of my improved means to varying conditions, it is apparent that other modifications may be made without, however, departing from the spirit of my invention; the invention having been described in terms employed merely as terms of description and not as terms of limitation.

What I claim is:

1. Means of the character described, comprising a main body member substantially semi-cylindrical to provide a pipe-receiving socket, the longitudinal sides of the main member on the inner surface being grooved longitudinally from end to end, a complementary member substantially semi-cylindrical with its longitudinal edges disposed outwardly and adapted to slide in said grooves of the main member, the main member and said complementary member being each provided with a laterally disposed projection adapted to extend substantially parallel with each other when the complementary member is in place, and means engaging with both projections for holding the complementary member against movement.

2. Means of the character described, comprising a main member having an open sided channel extending from end to end adapted to provide a pipe seat, the inner longitudinal sides of the main member being grooved from end to end, said member being provided with an attaching flange, a complementary member formed with an open sided channel from end to end, the longitudinal edges of the complementary member being disposed outwardly and adapted to slide into the grooves of the main member, the main member and complementary member being provided with correlated apertured members for the passage of a bolt therethrough, whereby the complementary member is held in place against movement.

3. Means of the class described comprising a pair of members, one of said members having a base provided with an apertured attaching portion while the forward side of the base is provided with a pair of extensions spaced apart to provide an open-sided pipe receiving channel therebetween adapted to permit lateral introduction of the pipe, the opposing side walls of the extensions being slotted from end to end in a direction lengthwise of the pipe channel with the slots diminishing in width toward one end of said member, while the other member is socketed on its rear face to provide a pipe channel and having laterally disposed straight longitudinal edges adapted to slide lengthwise in the slots of said first member, with the longitudinal sides of the second member tapering toward the tip or initially inserted end whereby an increased wedging relation between both members and the pipe is obtained as the second member slides lengthwise of the first member.

4. Means of the class described comprising a pair of members of width greater than the thickness of the pipe to be supported thereby and having arcuate surfaces adapted to jointly provide a substantially uniform pipe receiving channel therebetween, one of said members being formed to have the pipe extend therethrough and to receive the other member, the two members being provided with coacting tapering surfaces whereby increased wedging action on the pipe is obtained as the second member enters into the first member, both members having laterally disposed portions adapted to extend substantially parallel with each other, and means engaging said portions whereby telescopic movement of the two members is induced and the pipe clamping position maintained.

5. Means of the class described comprising a pipe receiving member, a complementary member adapted to fit into said first member to extend lengthwise of the pipe, both members having coacting surfaces whereby increased wedging action on the pipe is induced by telescopic movement of the complementary member and the first member, correlated bolt receiving portions on both members, and bolt clamping means adapted to engage with both of said portions whereby screwing up of the bolt will increase the wedging action of said members.

6. Means of the class described comprising a pair of members adapted to be disposed about and to anchor a pipe in place, said members on their inner opposing faces being concaved, the two members combinedly forming a pipe-receiving channel and being formed to have telescopic relation with each other and the surfaces of the two members which contact with each other being tapered whereby increased wedging action on the pipe is obtained as longitudinal movement of the one member relative to the other is induced, one of said members being adapted to be secured against movement, and regulable means disposed lengthwise of the members whereby said relative longitudinal movement is induced and the wedging position of the members maintained.

7. Means of the class described comprising a pair of members for anchoring a pipe in place adapted to extend lengthwise of the pipe with one of the members substantially encircling the pipe and having longitudinally disposed grooves in opposite side walls communicating with the pipe receiving channel of the member, while the other member is adapted to partially encircle the pipe and is provided with laterally disposed side portions adapted to ride in said grooves, said members being formed to provide increased wedging action on the pipe as telescopic movement of the two members is induced, means whereby one of said members is secured against movement, and regulable means whereby the two members are drawn into telescopic relation and the wedging position maintained.

8. Means of the class described comprising a pair of elongated members, one of said members being adapted to have a pipe disposed lengthwise therein, while the other member is provided with a concaved pipe engaging surface extending lengthwise of said member, said member being adapted to extend into the first member, the two members having coacting tapered surfaces whereby increased wedging action on the pipe is provided as said second member moves into the first member, and regulable means whereby the members are drawn into telescopic relation and their pipe wedging position maintained.

9. Air line supporting means comprising a pair of elongated members, one of the members being formed to have a pipe extend therethrough and to receive the other member which only partially extends about the pipe, both members having arcuate surfaces which combinedly form a substantially cylindrical pipe receiving channel therebetween, the inner face of said first mentioned member adjacent its pipe engaging surface having a laterally enlarged opening to receive the longitudinal sides of the other member, while other portions of both members are tapered in a lengthwise direction and said tapered portions adapted to contact with each other and thereby provide increasing clamping action on the pipe as the members move into telescopic relation, one of said members having a laterally disposed attaching portion.

WILLIAM WRIGHT.